US012080023B2

(12) United States Patent
Ebiyama et al.

(10) Patent No.: US 12,080,023 B2
(45) Date of Patent: Sep. 3, 2024

(54) TRAJECTORY LINKING APPARATUS, TRAJECTORY LINKING METHOD, AND NON-TRANSITORY COMPUTER READABLE MEDIUM STORING PROGRAM

(71) Applicant: NEC Corporation, Tokyo (JP)

(72) Inventors: Yukie Ebiyama, Tokyo (JP); Ryoma Oami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 351 days.

(21) Appl. No.: 17/618,559

(22) PCT Filed: Jun. 25, 2019

(86) PCT No.: PCT/JP2019/025138
§ 371 (c)(1),
(2) Date: Dec. 13, 2021

(87) PCT Pub. No.: WO2020/261378
PCT Pub. Date: Dec. 30, 2020

(65) Prior Publication Data
US 2022/0245855 A1    Aug. 4, 2022

(51) Int. Cl.
*G06T 7/73*    (2017.01)
*G06V 10/62*    (2022.01)
(Continued)

(52) U.S. Cl.
CPC ............... *G06T 7/73* (2017.01); *G06V 10/62* (2022.01); *G06V 10/761* (2022.01);
(Continued)

(58) Field of Classification Search
CPC ... G06T 7/73; G06T 2207/30241; G06T 7/20; G06V 10/62; G06V 10/761;
(Continued)

(56) References Cited

U.S. PATENT DOCUMENTS

| 2012/0148102 A1 | 6/2012 | Moriguchi et al. |
| 2013/0054142 A1 | 2/2013 | Moriguchi et al. |

(Continued)

FOREIGN PATENT DOCUMENTS

| JP | 2014-186547 A | 10/2014 |
| JP | 2018-093283 A | 6/2018 |

(Continued)

OTHER PUBLICATIONS

International Search Report for PCT Application No. PCT/JP2019/025138, mailed on Sep. 17, 2019.
(Continued)

*Primary Examiner* — Stephen P Coleman

(57) ABSTRACT

A trajectory linking apparatus capable of linking a trajectory having a feature value with a trajectory having no feature value is provided. The trajectory linking apparatus includes a feature-including trajectory linking unit and an interpolation unit. The feature-including trajectory linking unit receives trajectory information for each time segment. The trajectory information represents a plurality of trajectories indicating respective movement paths of a plurality of objects detected from image data of a respective time segment, and also indicating whether or not each of the trajectories has a feature for object re-identification. The feature-including trajectory linking unit generates a linked trajectory having a feature by linking a first trajectory having a feature with a second trajectory. The interpolation unit generates an interpolated trajectory by linking a third trajectory to the first and second trajectories.

10 Claims, 10 Drawing Sheets

(51) Int. Cl.
*G06V 10/74* (2022.01)
*G06V 10/77* (2022.01)

(52) U.S. Cl.
CPC ............... *G06V 10/7715* (2022.01); *G06T 2207/30241* (2013.01); *G06V 2201/07* (2022.01)

(58) Field of Classification Search
CPC .......... G06V 10/7715; G06V 2201/07; G06V 40/103; G06V 40/25
USPC ....................................................... 382/103
See application file for complete search history.

(56) References Cited

U.S. PATENT DOCUMENTS

2014/0286531 A1   9/2014   Pham
2017/0206669 A1   7/2017   Saleemi et al.

FOREIGN PATENT DOCUMENTS

WO   2011/021588 A1   2/2011
WO   2011/151999 A1   12/2011

OTHER PUBLICATIONS

Yuan Li et al., "Learning to Associate: HybridBoosted Multi-Target Tracker for Crowded Scene" in Proc. of CVPR 2009, IEEE, pp. 2953-2960.
Kato Naoki et al., "Online Multi-Object Tracking with Tracklet Re-Identification," Proceedings of VIEW2018, Dec. 6-7, 2018, Yokohama, pp. 50-57.

TRAJECTORY LINKING APPARATUS, TRAJECTORY LINKING METHOD, AND NON-TRANSITORY COMPUTER READABLE MEDIUM STORING PROGRAM

This application is a National Stage Entry of PCT/JP2019/025138 filed on Jun. 25, 2019, the contents of all of which are incorporated herein by reference, in their entirety.

TECHNICAL FIELD

The present disclosure relates to a trajectory linking apparatus, a trajectory linking method, and a non-transitory computer readable medium storing a program.

BACKGROUND ART

A method for tracking an object detected in time-series images and generating a movement line thereof has been proposed. Patent Literature 1 discloses a method for tracking a person detected in each frame of an image acquired by a camera by associating the person over different frames, and thereby extracting a movement line thereof. In this process, a detection result in each frame is used as a node, and a network is built by linking nodes through an edge whose cost is the likelihoods of the association of detection results between frames. Then, a tracking result is obtained by formulating the built network as a minimum cost flow problem. Patent Literature 1 also discloses that, in the calculation of the cost of an edge, similarity between heights and/or between appearances, in addition to the spatio-temporal proximity in the detection result, are also used.

Non-patent Literature 1 also discloses a technique in which a tracking result is obtained by associating a person detected in each frame over different frames based on the framework of a minimum cost flow. However, instead of obtaining all the associations at once by the minimum cost flow, associations are repeatedly made by the minimum cost flow over a plurality of stages. In this way, the overall movement line of a person is obtained by gradually linking the trajectories of the person. In this process, as a similarity model for determining the costs of edges, the smoothness of the movement of the person and the similarity based on a color histogram of the appearance, in addition to the spatio-temporal proximity between trajectories, are also used.

Non-patent Literature 2 also discloses a method for tracking a person captured by a camera. Note that the tracking of the person is performed by combining two types of tracking, i.e., short-term tracking and long-term tracking. A trajectory having a certain length is obtained by the short-term tracking. Regarding the long-term tracking, an embedding vector, which is obtaining by learning for re-identification, is obtained for each trajectory, and matching of embedding vectors is performed between possibly-linkable trajectories. Then, a movement line, which is a final tracking result, is obtained by selecting and associating embedding vectors which have best matched.

CITATION LIST

Patent Literature

Patent Literature 1: US2017/0206669A1, Saleemi et al, "Detecting, tracking and counting objects in videos"

Non Patent Literature

Non-patent Literature 1: Yuan Li, Chang Huang and Ram Nevatia, "Learning to Associate: HybridBoosted Multi-Target Tracker for Crowded Scene," in Proc. of CVPR 2009.

Non-patent Literature 2: KATO Naoki, TANABIKI Masamoto, FURUYAMA Junko, SATO Yuji, AOKI Yoshimitsu, "Online Multi-Object Tracking with Tracklet Re-Identification," Proceedings of ViEW2018.

SUMMARY OF INVENTION

Technical Problem

However, a case where an appearance feature value such as a color histogram or a re-identification feature value cannot be obtained is not assumed in any of Patent Literature 1 and Non-patent Literatures 1 and 2. There may be many cases where although an object can be tracked, a feature value required for identifying the object cannot be obtained with high reliability due to occlusion between persons or partial occlusion by other objects. In such cases, there is a trajectory having no feature value, causing a problem that it is impossible to link the trajectory having not feature value with other trajectories having feature values.

An object of the present disclosure is to solve the above-described problem. That is, an object of the present disclosure is to provide a trajectory linking apparatus, a trajectory linking method, and a non-transitory computer readable medium storing a program, capable of linking a trajectory having a feature value used for identifying an object with a trajectory having no feature value.

Solution to Problem

A trajectory linking apparatus according to the present disclosure is a trajectory linking apparatus including first means and second means, in which the first means receives trajectory information for each time segment (each time section), the trajectory information representing a plurality of trajectories indicating respective movement paths of a plurality of objects detected from image data (image information) of a respective time segment, and also indicating whether or not each of the trajectories has a feature for object re-identification, the first means generates a linked trajectory having a feature by linking a first trajectory included in first trajectory information obtained from image data in a first time segment to a second trajectory included in second trajectory information obtained from image data in a second time segment different from the first time segment, the first trajectory having the feature, and the second trajectory having the feature, and the second means generates an interpolated trajectory by linking a third trajectory included in third trajectory information obtained from image data in a third time segment between the first and second time segments to the first and second trajectories, the third trajectory not having the feature.

Further, a trajectory linking method according to the present disclosure includes: receiving trajectory information for each time segment (each time section), the trajectory information representing a plurality of trajectories indicating respective movement paths of a plurality of objects detected from image data (image information) of a respective time segment, and also indicating whether or not each of the trajectories has a feature for object re-identification; generating a linked trajectory having a feature by linking a first trajectory included in first trajectory information obtained from image data in a first time segment to a second trajectory included in second trajectory information obtained from image data in a second time segment different from the first time segment, the first trajectory having the feature, and the second trajectory having the feature, and generating an interpolated trajectory by linking a third trajectory included in third trajectory information obtained from image data in a third time segment between the first and second time segments to the first and second trajectories, the third trajectory not having the feature.

Further, a non-transitory computer readable medium according to the present disclosure stores a program for causing a computer to perform processes including: receiving trajectory information for each time segment (each time section), the trajectory information representing a plurality of trajectories indicating respective movement paths of a plurality of objects detected from image data (image information) of a respective time segment, and also indicating whether or not each of the trajectories has a feature for object re-identification; generating a linked trajectory having a feature by linking a first trajectory included in first trajectory information obtained from image data in a first time segment to a second trajectory included in second trajectory information obtained from image data in a second time segment different from the first time segment, the first trajectory having the feature, and the second trajectory having the feature, and generating an interpolated trajectory by linking a third trajectory included in third trajectory information obtained from image data in a third time segment between the first and second time segments to the first and second trajectories, the third trajectory not having the feature.

Advantageous Effects of Invention

According to the present disclosure, it is possible to provide a trajectory linking apparatus, a trajectory linking method, and a non-transitory computer readable medium storing a program, capable of linking a trajectory having a feature value used for identifying an object with a trajectory having no feature value.

DESCRIPTION OF EMBODIMENTS

Figure 1:
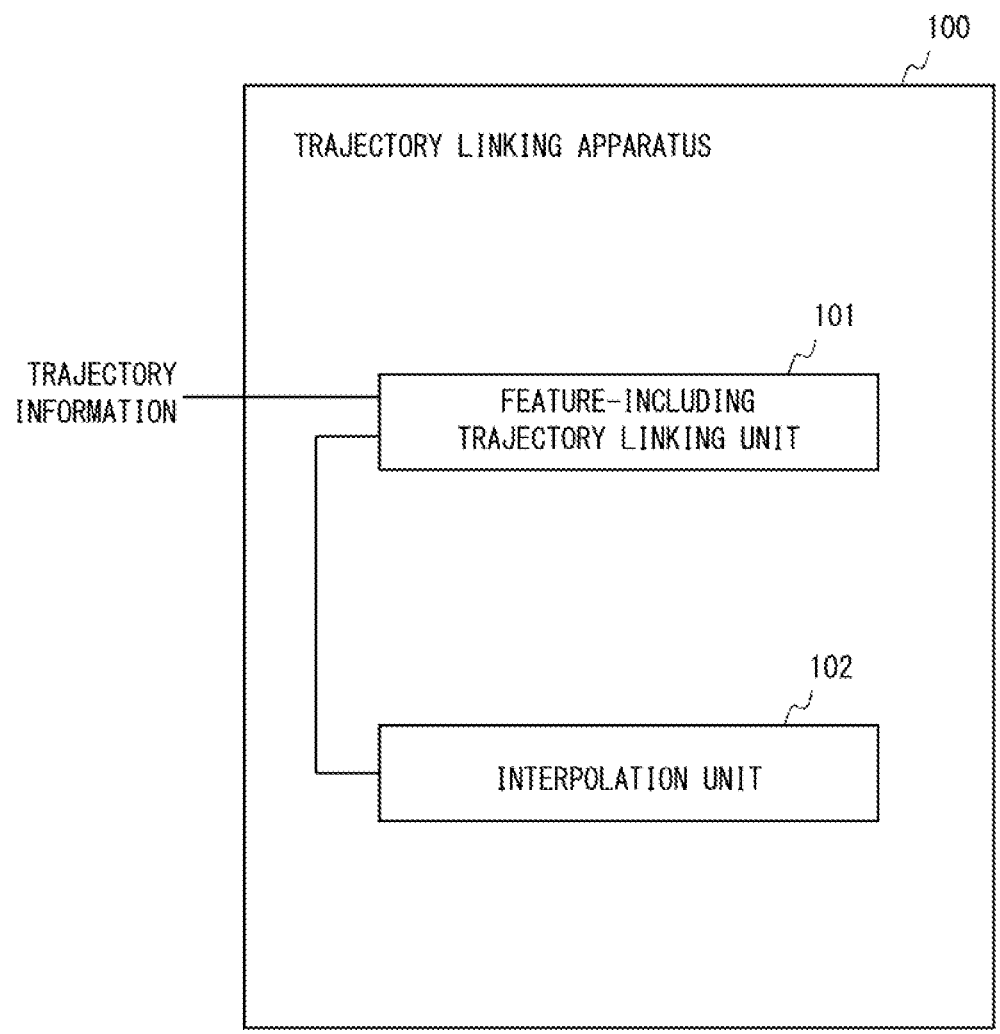
FIG. 1 is a configuration diagram showing a configuration of a trajectory linking apparatus according to a first example embodiment.

Example embodiments will be described hereinafter with reference to the drawings. Note that since the drawings are drawn in a simplified manner, the technical scope of the example embodiments should not be narrowly interpreted based on the descriptions of the drawings. Further, the same elements are denoted by the same reference numerals, and redundant descriptions thereof are omitted.

First Example Embodiment

FIG. 1 is a configuration diagram showing a trajectory linking apparatus 100 according to a first example embodiment. The trajectory linking apparatus 100 includes a feature-including trajectory linking unit 101 and an interpolation unit 102.

The feature-including trajectory linking unit 101 receives trajectory information for each time segment (each time section). The trajectory information includes a plurality of trajectories indicating respective movement paths of a plurality of objects detected from image data (image information) of a respective time segment. Further, the trajectory information also includes information as to whether or not each of the trajectories has a feature for object re-identification.

The feature-including trajectory linking unit 101 generates a linked trajectory having a feature by linking a first trajectory that has the feature and is included in first trajectory information obtained from image data in a first time segment to a second trajectory that has the feature and is included in second trajectory information obtained from image data in a second time segment different from the first time segment. The feature-including trajectory linking unit 101 may generate a network in which each trajectory having a feature is used as a node, and link trajectories by setting a cost between each node.

The interpolation unit 102 generates an interpolated trajectory by linking a third trajectory that has no feature and is included in third trajectory information obtained from image data in a third time segment between the first and second time segments to the first and second trajectories. The interpolation unit 102 may build a network in which each trajectory is used as a node, and interpolate a trajectory having no feature by setting a cost between each node and obtaining the shortest path between each trajectory having a feature.

The trajectory linking apparatus 100 generates an interpolated trajectory by generating a linked trajectory having a feature by using trajectories having features and interpolating a trajectory having no feature between the trajectories having features. Therefore, according to this example embodiment, it is possible to link a trajectory having a feature value used for identifying an object with a trajectory having no feature value.

Second Example Embodiment

Figure 2:
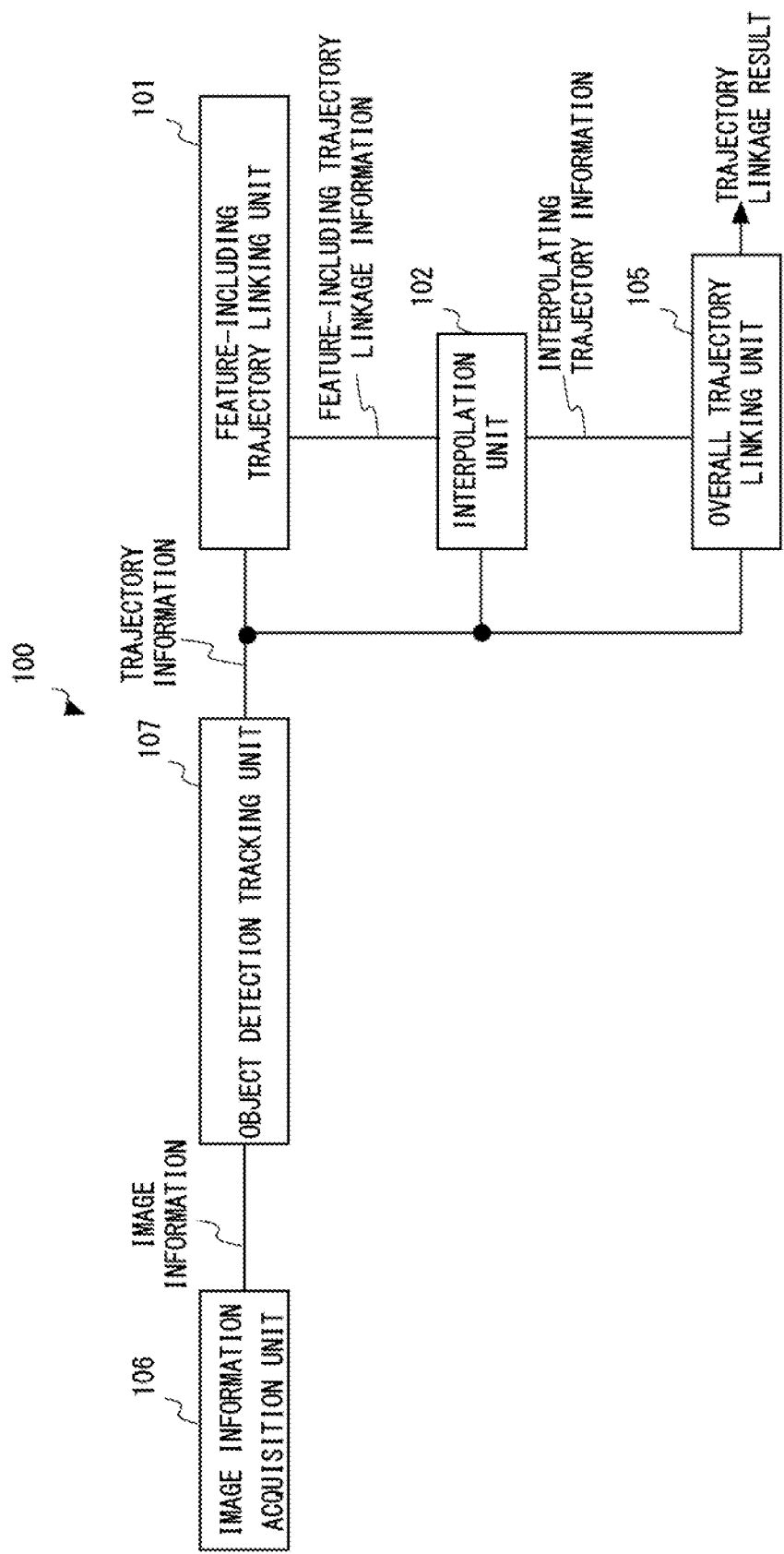
FIG. 2 is a configuration diagram showing a configuration of a trajectory linking apparatus according to a second example embodiment.

FIG. 2 is a configuration diagram of a trajectory linking apparatus 100 according to a second example embodiment. The trajectory linking apparatus 100 includes an image information acquisition unit 106, an object detection tracking unit 107, a feature-including trajectory linking unit 101, an interpolation unit 102, and an overall trajectory linking unit 105.

The image information acquisition unit 106 acquires an image and outputs image information to the object detection tracking unit 107.

The object detection tracking unit 107 detects an object(s) from the image information output from the image information acquisition unit 106, and performs a tracking process therefor. The object detection tracking unit 107 generates trajectory information by extracting a feature value for identification, and outputs the generated trajectory information to the feature-including trajectory linking unit 101, the interpolation unit 102, and the overall trajectory linking unit 105.

The feature-including trajectory linking unit 101 links trajectories having feature values for re-identification based on the trajectory information output from the object detection tracking unit 107, and outputs feature-including trajectory linkage information to the interpolation unit 102.

The interpolation unit 102 interpolates a trajectory based on the trajectory information output from the object detection tracking unit 107 and the feature-including trajectory linkage information output from the feature-including trajectory linking unit 101, and outputs interpolating trajectory information to the overall trajectory linking unit 105.

The overall trajectory linking unit 105 generates a result obtained by linking the whole trajectories based on the trajectory information output from the object detection tracking unit 107 and the interpolating trajectory information output from the interpolation unit 102, and outputs the generated result as a trajectory linkage result.

Next, operations performed by the trajectory linking apparatus 100 will be described. The image information acquisition unit 106 captures a video image of an area to be monitored or an object to be monitored. Note that any kind of means for capturing a video image may be used as long as it can take a video image. For example, it may be a fixed monitoring camera or a web camera, or a camera installed in a moving object such as a UAV or a vehicle. Alternatively, it may be a body-worn camera worn by a police officer or a security guard, or a video camera by which a user performs shooting. However, in the case of a moving camera, camera parameters representing the pose, the zoom ratio, and the like of the camera, which are required for converting a position on an image to a position in the real space, are also acquired together with the video image whenever these parameters are changed. The video image captured by the image information acquisition unit 106 is output as a series of video images.

The object detection tracking unit 107 performs object detection and tracking on the image input from the image information acquisition unit 106, and generates trajectory information which is time-series information of the position of each object. The trajectory information is collectively generated and output for each predetermined time section. For example, when the duration of the time section is a time T, the trajectory information is output at intervals of the time T. In this process, feature values necessary for identification are also extracted and output as a part of the trajectory information. However, there are cases where no feature value can be extracted within the predetermined time T. Therefore, in the case of a trajectory of an object of which no feature value can be extracted, information indicating that the trajectory includes no feature value is added to the trajectory information. Note that details of the operation of the object detection tracking unit 107 will be described later.

The feature-including trajectory linking unit 101 associates trajectories with one another by using only the trajectories each of which has a feature for re-identification, included in the trajectory information output from the object detection tracking unit 107. That is, the feature-including trajectory linking unit 101 associates trajectories that seem to those of the same object with each other, and thereby groups them together. When doing so, the feature-including trajectory linking unit 101 does not associate trajectories by using only their feature values, but instead does associate trajectories while taking information about spatio-temporal proximity between the trajectories into consideration as well as the feature values thereof.

How to associate trajectories will be described hereinafter. Although a method for association in the framework of a minimum cost flow will be described hereinafter, the method is not limited to the below-shown example and an arbitrary method for association can be used.

A minimum cost flow problem is a problem for building a network that starts from a start point (a source) and extends toward an end point (a sink), and obtaining a flow in which the overall cost from the start point to the end point is the lowest. A capacity representing the maximum value of a flowable flow and a cost required for the flow are defined at an edge connecting each node, i.e., each possible pair of nodes, of the network, and an optimal flow is obtained so that the cost is minimized.

When it is used to link trajectories obtained by tracking, each of the trajectories obtained by tracking is used as a node. Then, firstly, all the trajectories each of which has a feature value for re-identification are connected to the start point and the end point. Next, an edge is placed between trajectories that could be linked with each other when their moving velocities, distance, and similarity of feature values are taken into consideration. When doing so, the cost of the edge is determined based on a monotonically non-increasing function of the likelihood of linkage between trajectories so that the cost of the linkage between the trajectories that are likely to be linked with each other is reduced.

The likelihood of linkage between trajectories is determined based on spatio-temporal proximity between the trajectories or similarity between the feature values of the trajectories. The spatio-temporal proximity can be defined as the proximity of the time and position of the end of a source trajectory, i.e., a trajectory from which linkage starts, to the time and position of the start of a destination trajectory, i.e., a trajectory to which the linkage extends. An index of the likelihood of linkage between trajectories may be determined, for example, by a weighted addition of the mobility of the object between the trajectories and the feature values thereof. However, the method for integrating two (trajectories) is not limited to this example and an arbitrary method for integration can be used.

Further, regarding the spatio-temporal proximity, similarity between the velocities of trajectories may be taken into consideration. That is, how the moving velocity (the speed and the direction) at the end of the source trajectory and the moving velocity at the start of the destination trajectory are similar to each other may also be taken into consideration. Further, in the case of trajectories that temporally overlap each other, the spatio-temporal proximity may be evaluated based on the distance between the parts of the trajectories in the overlapped section.

The number of types of features for re-identification is not limited to one. When there are a plurality of feature values, overall similarity is calculated by integrating their similarities. As the integration method, any relevant integration method, such as a weighted addition or a method for obtaining a function to fuse similarities of a plurality of feature values through learning, can be used.

After building the network, the feature-including trajectory linking unit 101 finds a solution to the minimum cost flow problem. It is possible to find the solution to the minimum cost flow problem by applying, for example, a Primal-Dual method.

The feature-including trajectory linking unit 101 determines an edge at which the flow has flowed as an edge where the object has actually moved. The feature-including trajectory linking unit 101 groups trajectories linked by an edge(s) at which the flow has flowed into one group, and thereby generates feature-including trajectory linkage information. Note that, at this point, groups of trajectories are not integrated to form one movement line. The integration process is performed by the overall trajectory linking unit 105 after a result of the overall trajectory linkage is determined.

The linkage relation between trajectories may be obtained by using other methods instead of using the framework of the minimum cost flow. For example, a bipartite graph in which a source trajectory and a destination trajectory are used as nodes may be created, and a correspondence relation between them may be determined. In this case, all the trajectories are included in both the source trajectories and the destination trajectories. Then, the costs of edges are determined based on the likelihoods of linkage, and each edge is associated with its cost. The method for determining a cost is similar to that in the above-described case of the minimum cost flow. However, the costs between these trajectories are set to sufficiently large values so that no association is made between the same trajectories or between trajectories that are reversed in the temporal order. Further, there may be cases in which some of the trajectories may be those from which no linkage starts or to which no linkage extends. Therefore, the same number of dummy nodes as the number of trajectories may be provided in each of source trajectories and destination trajectories in order to cope with such cases. When a node is associated with a dummy node, it is assumed that its source trajectory or destination trajectory does not exist. It is possible to solve associations in the bipartite graph, for example, by a Hungarian method. Further, feature-including trajectory linkage information is generated by grouping trajectories that have been associated with each other into one group.

The generated feature-including trajectory linkage information is input to the interpolation unit 102. The interpolation unit 102 extracts, from the remaining trajectories having no feature for re-identification, included in the trajectory information output from the object detection tracking unit 107, trajectories that are present between trajectories having feature values associated with each other, and links them.

Firstly, the interpolation unit 102 builds a network representing possibilities of linkage between trajectories by using the whole trajectory information. The method for building a network is similar to that of the feature-including trajectory linking unit 101. However, a cost of linkage with a trajectory having no feature value for re-identification is calculated without using similarity between feature values for re-identification.

Next, based on the feature-including trajectory linkage information, the interpolation unit 102 searches for a shortest path (a path in which the sum total of costs is minimized) in which linked trajectories having feature values are connected with one another. It is possible to obtain this shortest path by applying a Dijkstra method using potentials or the like. Interpolating trajectory information is generated by adding trajectories having no feature present on this shortest path, as trajectories to be interpolated, to the feature-including trajectory linkage information. The generated interpolating trajectory information is output to the overall trajectory linking unit 105. When doing so, the generated network information may also be output together with the interpolating trajectory information.

The overall trajectory linking unit 105 generates a result of the linkage of the whole trajectories from the trajectory information output from the object detection tracking unit 107 and the interpolating trajectory information output from the interpolation unit 102. Firstly, the overall trajectory linking unit 105 builds a network of the whole trajectories in a manner similar to that of the interpolation unit 102. In the case where the interpolation unit 102 outputs network information, the overall trajectory linking unit 105 uses the output network information as it is. Next, the overall trajectory linking unit 105 short-circuits (assigns the lowest cost to) the network of paths corresponding to the interpolating trajectories obtained by the interpolation unit 102, and updates the network by removing, from the trajectories on these paths, edges placed in trajectories other than the trajectories on these paths. After making such modifications, the overall trajectory linking unit 105 finds a solution in the framework of a minimum cost flow, and obtains a result of the linkage of the trajectories.

Lastly, the overall trajectory linking unit 105 generates overall trajectory linkage information by adding the interpolating trajectory information obtained by the interpolation unit 102 to the obtained trajectory linkage result. That is, the overall trajectory linkage result is obtained by adding the trajectory linkage result obtained as the interpolating trajectory information between the short-circuited edges. Then, movement line information is generated by integrating a group of trajectories included in the obtained linked trajectories into one and assigning an ID to each of the obtained movement lines, and the generated movement line information is output.

Further, it is also possible to obtain association by using the above-described bipartite graph without using the framework of the minimum cost flow. In this case, regarding the interpolating trajectory, the whole trajectories linked by the interpolation may be handled as one trajectory, and a bipartite graph may be created without using the trajectories included in the interpolating trajectories. Then, association may be obtained in a manner similar to the above-described method.

In this way, movement line information is generated and output for each time section T. Therefore, it is possible to output movement line information almost in real time, i.e., only with a delay of the time section T and that caused by the time required for the linking process. Therefore, it is possible to build a system suitable, for example, for a case where it is desired to use movement line information on the spot.

Figure 3:
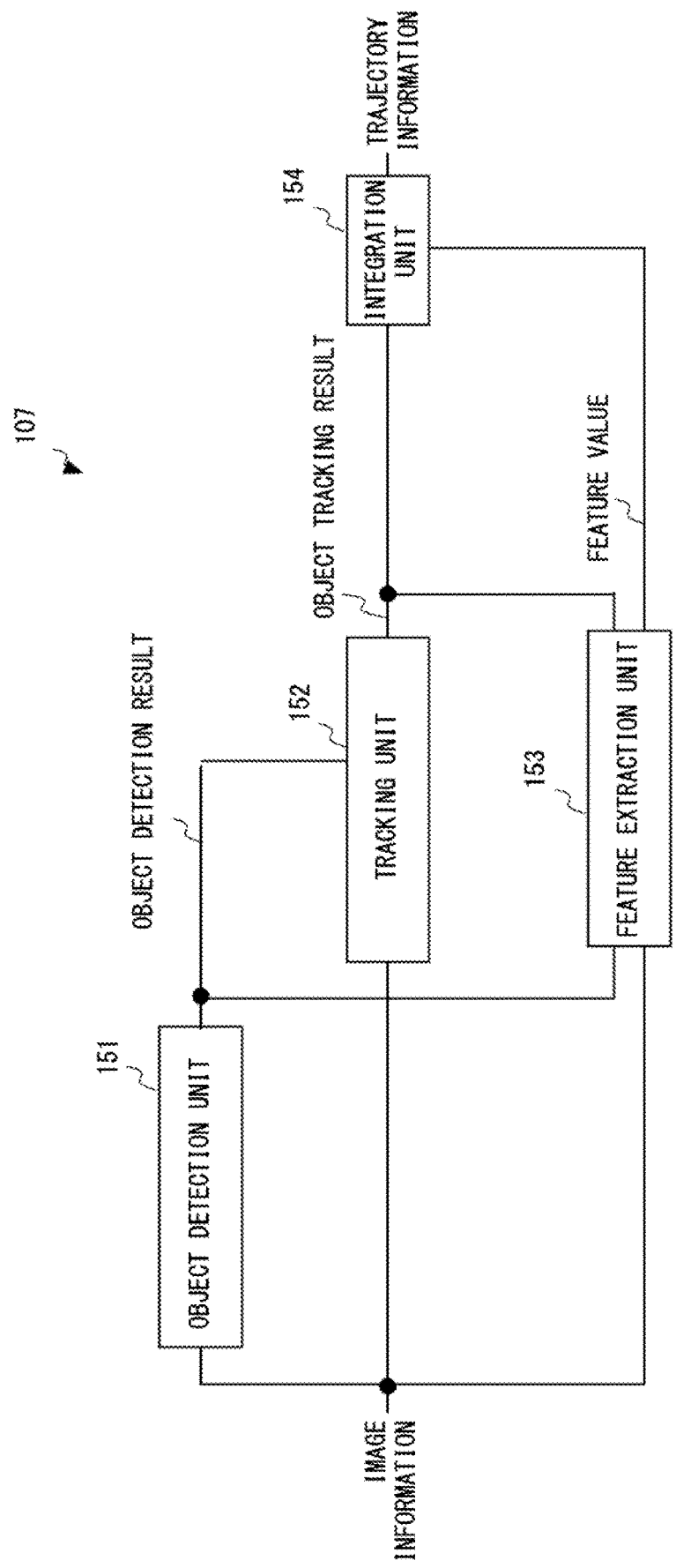
FIG. 3 is a configuration diagram showing a configuration of an object detection tracking unit provided in the trajectory linking apparatus according to the second example embodiment.

Next, the object detection tracking unit 107 will be described. FIG. 3 shows an example of a configuration of the object detection tracking unit 107. The object detection tracking unit 107 includes an object detection unit 151, a tracking unit 152, a feature extraction unit 153, and an integration unit 154.

The object detection unit 151 performs an object detection process for an input image. The object detection unit 151 outputs a result of the object detection to the tracking unit 152 and the feature extraction unit 153.

The tracking unit 152 performs an object tracking process based on the object detection result output from the object detection unit 151 and the input image. The tracking unit 152 outputs a result of the object tracking to the integration unit 154 and the feature extraction unit 153.

The feature extraction unit 153 extracts a feature value(s) for re-identification based on the input image, the object detection result output from the object detection unit 151, and the object tracking result output from the tracking unit 152, and outputs the extracted feature value(s) for re-identification to the integration unit 154.

The integration unit 154 generates trajectory information by integrating the object tracking result output from the tracking unit 152 and the feature value for re-identification output from the feature extraction unit 153, and outputs the generated trajectory information.

Next, operations performed by the object detection tracking unit 107 will be described. Firstly, image information is input to the object detection unit 151. The object detection unit 151 performs an object detection process and outputs a result thereof as object detection result information.

In the case where the object is a person, the object detection unit 151 detects the area of the person by using a detector that has learned image features of a person. For example, a detector that performs detection based on HOG (Histograms of Oriented Gradients) features, or a detector that performs detection directly from an image by using a CNN (Convolutional Neural Network) may be used. Alternatively, a person may be detected by using a detector that has learned a part(s) of the area of a person (such as a head) instead of having learned the whole body of a person. For example, if the position of a head and the positions of feet can be detected by using a detector that has learned a head and feet, it is possible to specify the area of a person. Further, for example, the object detection unit 151 may be configured to obtain the area of a person by combining silhouette information obtained by a background difference (information about an area where there is a difference from a background model) with head detection information.

In the case where the object is a car, the object detection unit 151 can detect it by using a detector that has learned image features of a car in a similar manner. In the case where the object is a specific object other than the person and the car, it is possible to build and use a detector that has learned image features of that specific object.

The object detection unit 151 collects information about the detected object and thereby generates the collected information as object detection result information. The object detection result information includes time information of a frame in which the detection was performed and information about the object. The time information may be a frame number or other information for identifying the frame. The object information includes a position at which the object was detected and the size of the object. The position of the object may be represented by the position on the image, or the position may be expressed by converting it into real-world coordinates by using parameters representing the position and pose of the camera obtained by calibration of the camera. For example, when it is expressed by the position on the image, it may be expressed by coordinates of vertices (e.g., the upper-left and lower-right vertices) of a rectangle surrounding the object. Alternatively, it may be represented by information about one vertex, the width, and the height of the rectangle.

Further, when a plurality of objects are detected, the object detection result information will include information about the plurality of detected objects. Further, it also includes ID information for distinguishing the detected objects from each other in the same frame. However, this ID information is one that is assigned to distinguish the plurality of objects detected in the same frame from each other, and is different from the ID information assigned to the object to be tracked. The generated object detection result information is output to the tracking unit 152 and the feature extraction unit 153.

The tracking unit 152 performs a tracking process based on a detection result, i.e., a tracking process called Tracking by Detection. That is, the tracking unit 152 updates a tracking result by determining, for each of the objects to be tracked included in the object detection result up to the immediately preceding time, which of the detected objects included in the object detection result at the current time corresponds to that object. When doing so, the position of each of the objects to be tracked may be predicted by a Kalman filter or a particle filter, and then may be associated with the detected object at the current time.

When the object to be tracked and the detected object are associated with each other, the information of the object to be tracked is updated by using the information about the associated detected object and the image at the time of the detection of the object. On the other hand, when the detected object is not associated with any of the objects to be tracked, there is a high possibility that the detected object is an object that has newly appeared. Therefore, an object to be tracked corresponding to that detected object is newly generated and added to the object tracking result. Further, when there is an object to be tracked that does not correspond to any of the detected objects, it is considered that that object to be tracked has disappeared for some reason such as because it went out of the image. Therefore, a process for deleting that object to be tracked from the tracking result is performed. However, there are cases where an object that is present in reality is not detected. Therefore, an object may not be deleted just because it is not detected only once, but may be deleted after it is not detected several times. For this control, a likelihood value representing the certainty of an object to be tracked may be defined. Then, starting from the time at which the object is newly generated, the likelihood value may be increased when association with the detected object is made, and may be decreased when no association is made. Further, when the likelihood value decreases below a certain value, the object may be deleted. Note that in the calculation of this likelihood value, the certainty of association at the time when the association is made, in addition to the information as to whether or not it is associated with the detection result, may also be taken into consideration. In this way, an object tracking result at the current time is generated and output.

Note that the object tracking result information includes the positions and sizes of objects in the image, ID information assigned to each of the objects to be tracked, and ID information of associated detected objects (when no association was made, information indicating that no association was made). Note that the method for describing position information is arbitrarily determined. An object to be tracked may be indicated by circumscribed rectangle information thereof. Alternatively, coordinates of one point in the area of an object to be tracked may be obtained, and size information thereof may be expressed by relative information based on that point. For example, when it is expressed by the position on the screen, it may be expressed by coordinates of the vertices (e.g., the upper-left and lower-right vertices) of a rectangle surrounding the object. Alternatively, it may be represented by information about one vertex, the width, and the height of the rectangle. Alternatively, it may be converted into coordinates in the real space and the obtained coordinates may be output. The generated object tracking result information is output to the feature extraction unit 153 and the integration unit 154.

The feature extraction unit 153 extracts a feature value(s) for re-identification of each of objects to be tracked from the image. The feature value to be extracted is, for example, a visual feature value(s) representing the color, shape, pattern, and/or the like of the object. The feature value may be any feature value(s) that can be used to identify the object. For example, it may be a histogram of a color or a luminance gradient feature, a local feature value(s) such as SIFT (Scale Invariant Feature Transform) or SURF (Speeded Up Robust Features), or a feature value(s) describing a pattern such as Gabor wavelet. Alternatively, it may be a feature value(s) for object identification obtained by deep learning.

Alternatively, it may be a feature(s) describing a motion or a movement. For example, when the object is a person, it may be a gait feature value(s) describing a feature(s) of a gait. In this case, the gait feature value is extracted from a plurality of time-series images within a time section T. For example, a GEI (Gait Energy Image) is generated by extracting silhouette information representing the shape of a person from an input image and integrating it in a time-series manner, and a gait feature value(s) extracted from the image may be used as the feature value.

Note that the number of feature values is not limited to one. That is, a plurality of feature values may be extracted. For example, the feature extraction unit 153 may extract a plurality of visual feature values and a plurality of motion feature values, and use them while combining them with each other. The feature value(s) extracted as described above is output to the integration unit 154.

The integration unit 154 generates trajectory information by integrating the object tracking result output from the tracking unit 152 and the feature value(s) of each object output from the feature extraction unit 153. That is, the integration unit 154 combines tracking results and feature values of objects having the same tracking ID obtained within the time T, and thereby generates trajectory information for that tracking ID.

When there is a tracking ID for which a plurality of feature values are obtained within the time T, the integration unit 154 may perform a process for integrating them. The integration unit 154 may, for example, select a predetermined number of reliable feature values while taking scores and reliabilities of obtained feature values into consideration, or may select a representative value by performing a statistical process. In this case, the representative value may be calculated by various methods, such as calculating an average, excluding outliers and then calculating an average, or obtaining a most frequent value.

Meanwhile, there may be a tracking ID for which no reliable feature value for re-identification can be extracted due to occlusion or the like. In such a case, the integration unit 154 incorporates information indicating that there is no feature value corresponding to that tracking ID into the trajectory information.

In the case where the position information in the tracking result is position information on the image, the integration unit 154 converts this value to coordinates in the real world and incorporates the obtained coordinates in the trajectory information. This conversion can be calculated by using camera parameters representing the pose, the position, the zoom ratio, and the like of the camera. In the case of a fixed camera, the camera parameters may be obtained in advance for later use. In the case of a movable camera, the camera parameters are newly obtained whenever the pose or position of the camera changes. In this way, the tracking unit 152 generates trajectory information in which a tracking result(s) and a feature value(s) for re-identification included in a predetermined time are integrated. The output trajectory information is used for the above-described subsequent processes.

Figure 4:
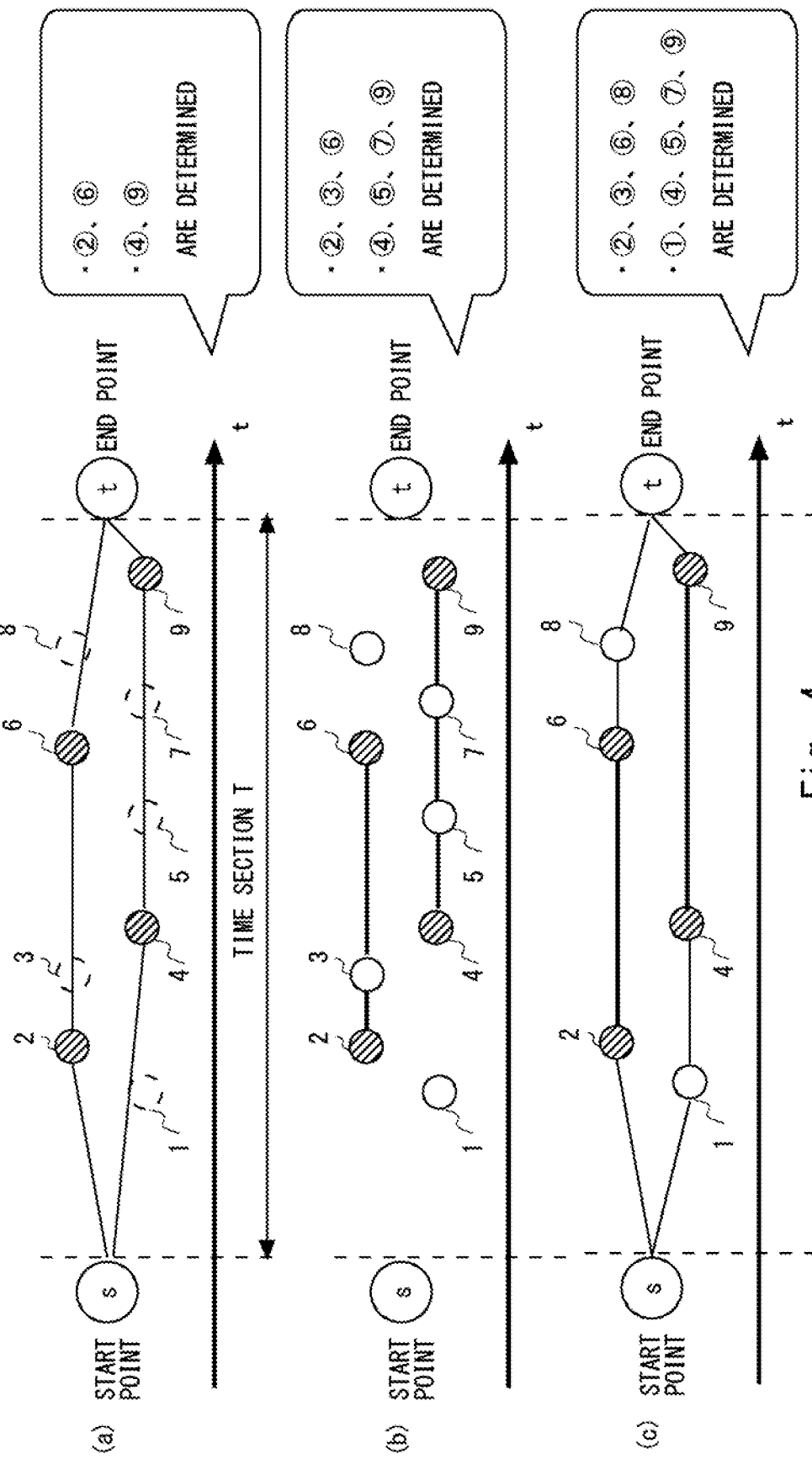
FIG. 4 is a schematic diagram showing an example in which linkage of trajectories is obtained by a minimum cost flow in the second example embodiment.

Next, a linking method by a minimum cost flow according to this example embodiment will be described by using a specific example. FIG. 4 shows an example of linkage of trajectories by a minimum cost flow. In FIG. 4, there are nine trajectories, i.e., trajectories 1 to 9, in a time section T. The trajectories 2, 4, 6 and 9 are trajectories each of which has a feature value. The trajectories 1, 3, 5, 7 and 8 are trajectories each of which has no feature value. In FIG. 4, the trajectories having feature values are indicated by hatching, and no hatching is added to the trajectories having no feature value.

FIG. 4(a) shows a process performed by the feature-including trajectory linking unit 101. The feature-including trajectory linking unit 101 builds a network of a minimum cost flow from the start point to the end point by using only the trajectories having feature values, and determines linkage of the trajectories having feature values. FIG. 4(b) shows a trajectory interpolation process performed by the interpolation unit 102. Interpolating trajectory information is generated by linking the trajectory 3 between the trajectories 2 and 6, and linking the trajectories 5 and 7 between the trajectories 4 and 9. FIG. 4(c) shows a process performed by the overall trajectory linking unit 105. The overall trajectory linking unit 105 performs a process for linking the remaining trajectories in the network in which the linkage obtained in FIG. 4(b) have been short-circuited. The overall trajectory linking unit 105 combines the obtained result with the result in FIG. 4(b). In the case of FIG. 4, the trajectories 2, 3, 6 and 8 are connected with one another, and the trajectories 1, 4, 5, 7 and 9 are connected with one another. In this way, the overall trajectory linking unit 105 can obtain linked trajectories.

Figure 5:
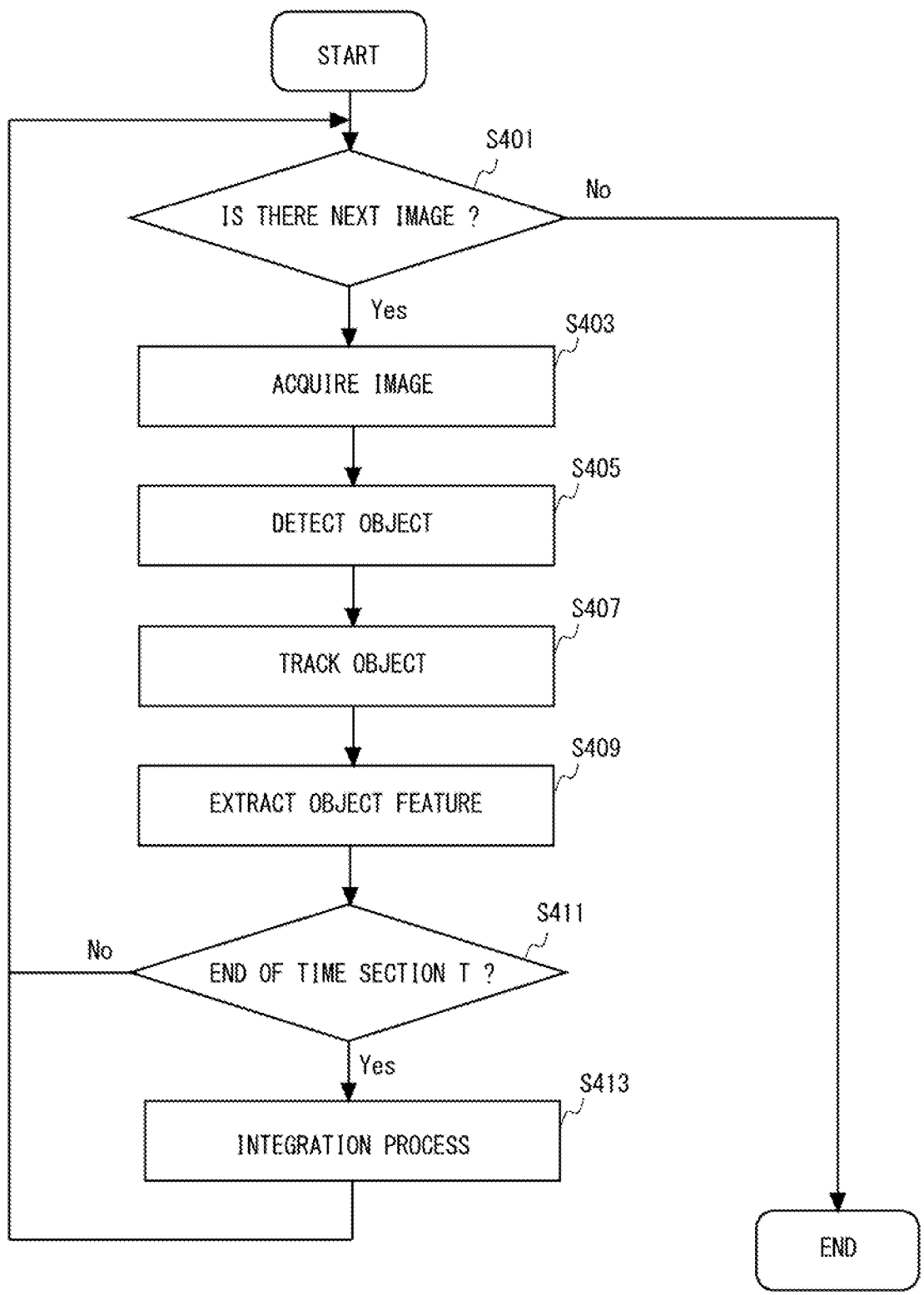
FIG. 5 is a flowchart showing processes performed by the object detection tracking unit provided in the trajectory linking apparatus according to the second example embodiment.

Next, a flow of processes performed in this example embodiment will be described by using a flowchart. FIG. 5 is a flowchart showing processes performed by the image information acquisition unit 106 and the object detection tracking unit 107. The image information acquisition unit 106 checks whether or not there is an image to be processed next (Step S401). Then, when there is no image to be processed (No in Step S401), the process is finished, whereas that is not the case (Yes in Step S401), the process proceeds to a step S403.

The image information acquisition unit 106 acquires an image (Step S403). Next, the object detection unit 151 performs a process for detecting an object, and thereby generates an object detection result (Step S405). The tracking unit 152 performs a process for tracking the object, and thereby generates an object tracking result (Step S407). The feature extraction unit 153 extracts a feature value(s) for re-identification of the object (Step S409). The object detection unit 151 checks whether or not it has reached the end of the time section T during which the process is performed. Then, when it has not reached the end of the time section T (No in Step S411), the process returns to the step S401 (Step S411). On the other hand, when it has already reached the end of the time section T (Yes in Step S411), the integration unit 154 performs a process for generating trajectory information by integrating the tracking result(s) and the feature value(s), and outputs the generated trajectory information (Step S413). After generating the trajectory information, the process returns to the step S401.

Figure 6:
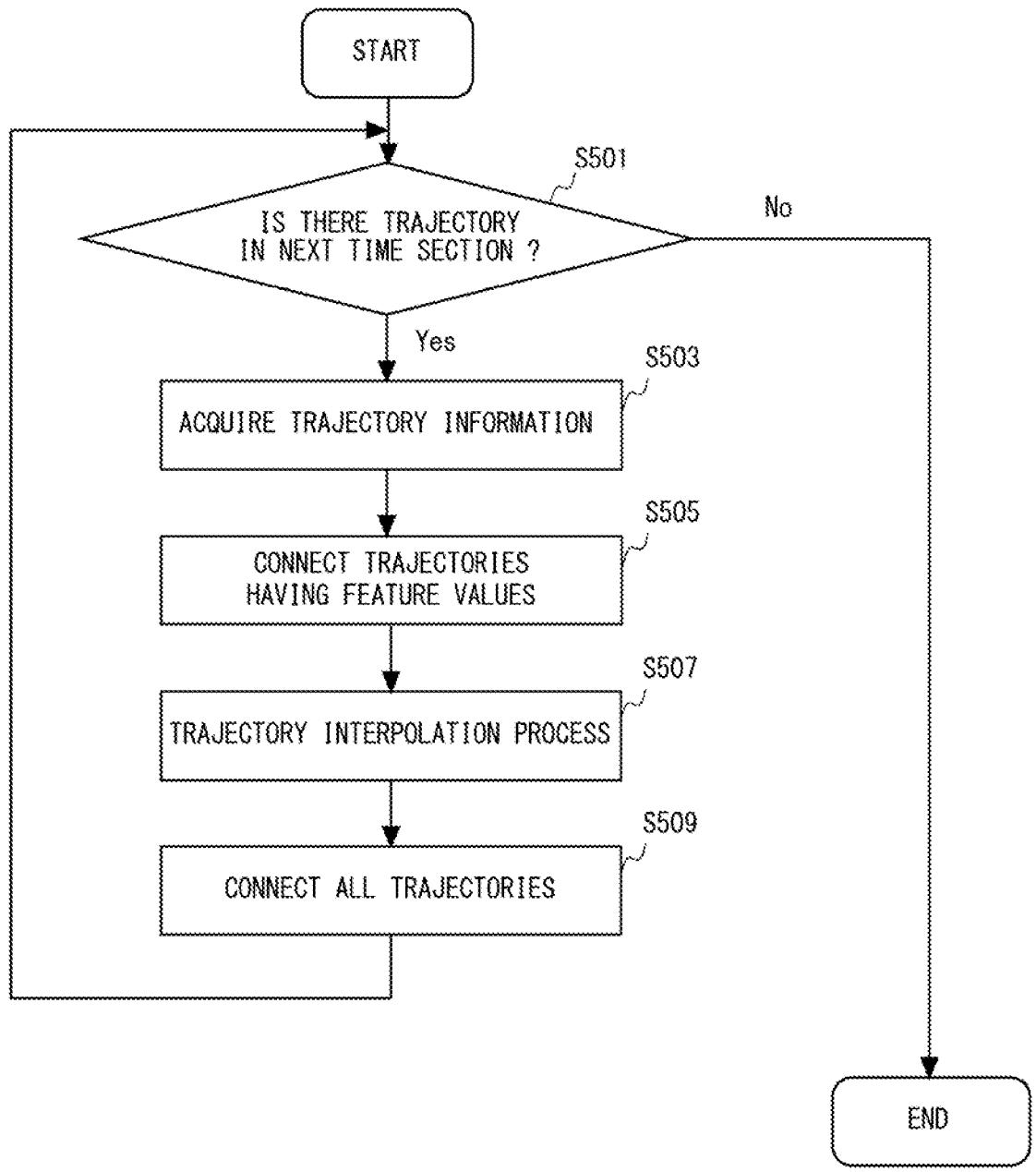
FIG. 6 is a flowchart showing processes performed by the trajectory linking apparatus according to the second example embodiment.

FIG. 6 shows a flowchart for processes performed by the feature-including trajectory linking unit 101, the interpolation unit 102, and the overall trajectory linking unit 105. The feature-including trajectory linking unit 101, the interpolation unit 102, and the overall trajectory linking unit 105 check whether or not there is trajectory information output from the object detection tracking unit 107. Then, when there is no trajectory information, the process is finished (Step S501). When there is trajectory information (Yes in Step S501), the feature-including trajectory linking unit 101, the interpolation unit 102, and the overall trajectory linking unit 105 acquire the trajectory information (Step S503).

The feature-including trajectory linking unit 101 links trajectories having feature values and thereby generates feature-including trajectory linkage information (Step S505). Next, the interpolation unit 102 performs a trajectory interpolation process, and thereby generates interpolating trajectory information (Step S507). The overall trajectory linking unit 105 links the whole trajectories, and thereby generates and outputs a trajectory linkage result (Step S509). After the step S509, the process returns to the step S501.

According to this example embodiment, it is possible to preferentially link trajectories having feature values even when there is a trajectory(ies) for which no feature value is obtained, and thereby to obtain an overall movement line. Further, the linkage is performed while taking, in addition to the feature values, the spatio-temporal connectivity of trajectories into consideration. Therefore, even when there are a plurality of persons wearing similar clothes, it is possible to obtain correct linkage and thereby to generate an accurate movement line.

Third Example Embodiment

Figure 7:
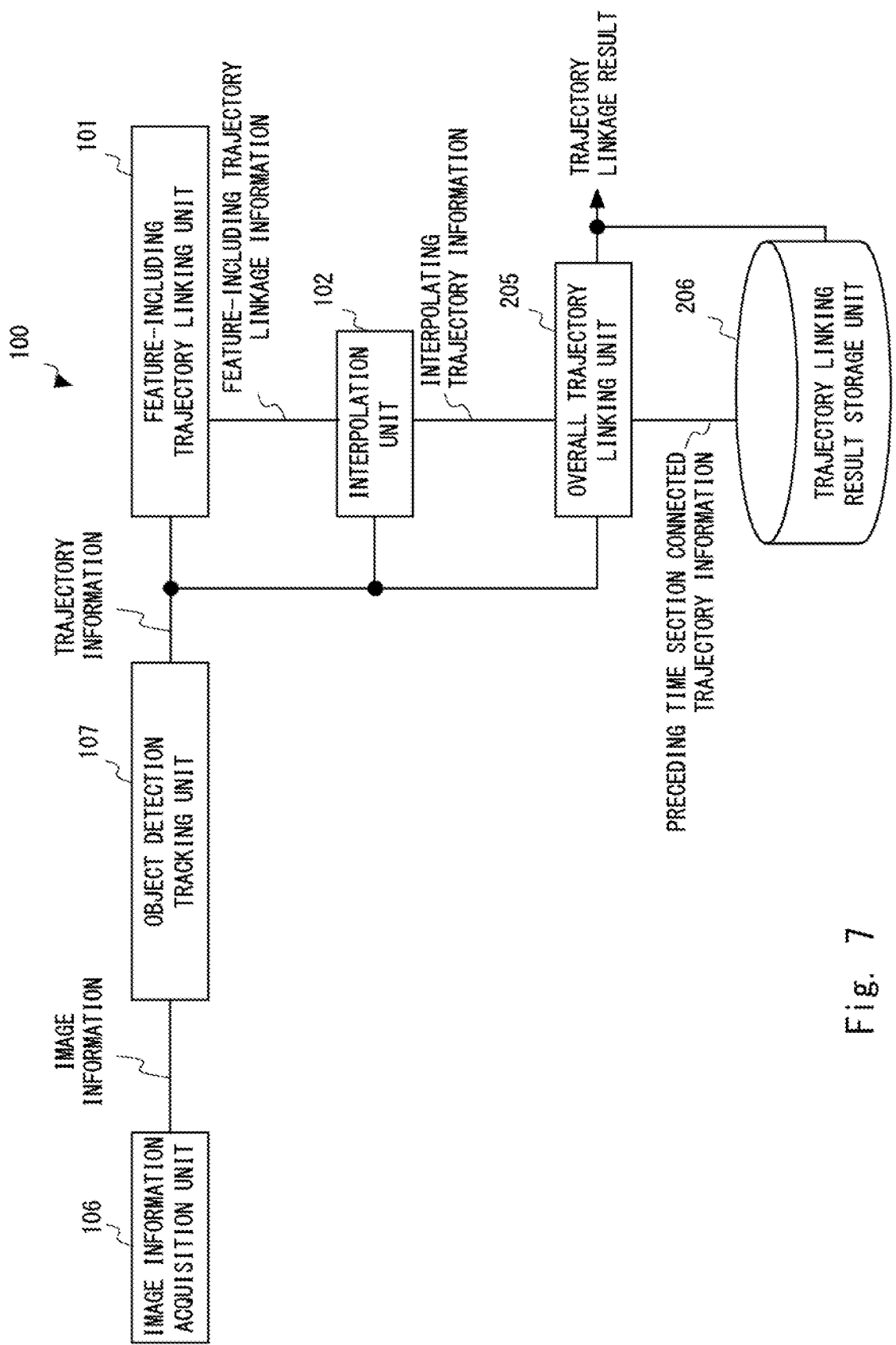
FIG. 7 is a configuration diagram showing a configuration of a trajectory linking apparatus according to a third example embodiment.

FIG. 7 shows a configuration diagram showing a trajectory linking apparatus 100 according to this example embodiment. The trajectory linking apparatus 100 includes an image information acquisition unit 106, an object detection tracking unit 107, a feature-including trajectory linking unit 101, an interpolation unit 102, an overall trajectory linking unit 205, and a trajectory linkage result storage unit 206.

As compared to FIG. 2, the trajectory linkage result storage unit 206 is newly added. Further, the overall trajectory linking unit 105 is replaced by the overall trajectory linking unit 205. Except for the overall trajectory linking unit 205 and the trajectory linkage result storage unit 206, the rest of the connection relation is similar to that in FIG. 2.

The overall trajectory linking unit 205 generates a result of linkage of the whole trajectories based on trajectory information output from the object detection tracking unit 107, interpolated trajectory information output from the interpolation unit 102, and preceding time section trajectory linkage information stored in the trajectory linkage result storage unit 206, and outputs the generated result as a trajectory linkage result.

The trajectory linkage result storage unit 206 stores the trajectory linkage result information output from the overall trajectory linking unit 205. The trajectory linkage result storage unit 206 outputs the preceding time section trajectory linkage information to the overall trajectory linking unit 205.

Operations performed by the trajectory linking apparatus 100 shown in FIG. 7 will be described.

Except for the operations performed by the overall trajectory linking unit 205 and the trajectory linkage result storage unit 206, those performed by the trajectory linking apparatus 100 are similar to those performed by the trajectory linking apparatus 100 shown in FIG. 2.

The operation of the overall trajectory linking unit 205 is basically similar to that of the overall trajectory linking unit 105. The overall trajectory linking unit 205 further updates the network by using the result of the linkage of the trajectories in the preceding time section, stored in the trajectory linkage result storage unit 206. That is, the overall trajectory linking unit 205 connects each of linked trajectories obtained in the preceding time section with the start point, and generates an edge(s) for trajectories in the current time section that could be connected from its end point, and thereby updates the network. Then, the overall trajectory linking unit 205 finds a solution in the framework of a minimum cost flow, and thereby obtains a result of the linkage of trajectories. Lastly, overall trajectory linkage information is generated by adding the interpolating trajectory information obtained by the interpolation unit 102 in the obtained trajectory linkage result.

Then, movement line information is generated by integrating a group of trajectories included in the obtained linked trajectories into one, and assigning an ID to each of the obtained movement lines. When doing so, when it is linked to a linked trajectory in the preceding time section, the ID of that linked trajectory (the movement line) is used. Further, when that is not the case, a new ID is assigned.

The generated movement line information is output to and stored in the trajectory linkage result storage unit 206 for processes in the subsequent time sections. When doing so, in the case of a movement line that is continued from that in the preceding time section, information such as feature values is updated. Then, the results stored in the trajectory linkage result storage unit 206 are used for linkage of trajectories in the overall trajectory linking unit 205 in the next time section.

Figure 8:
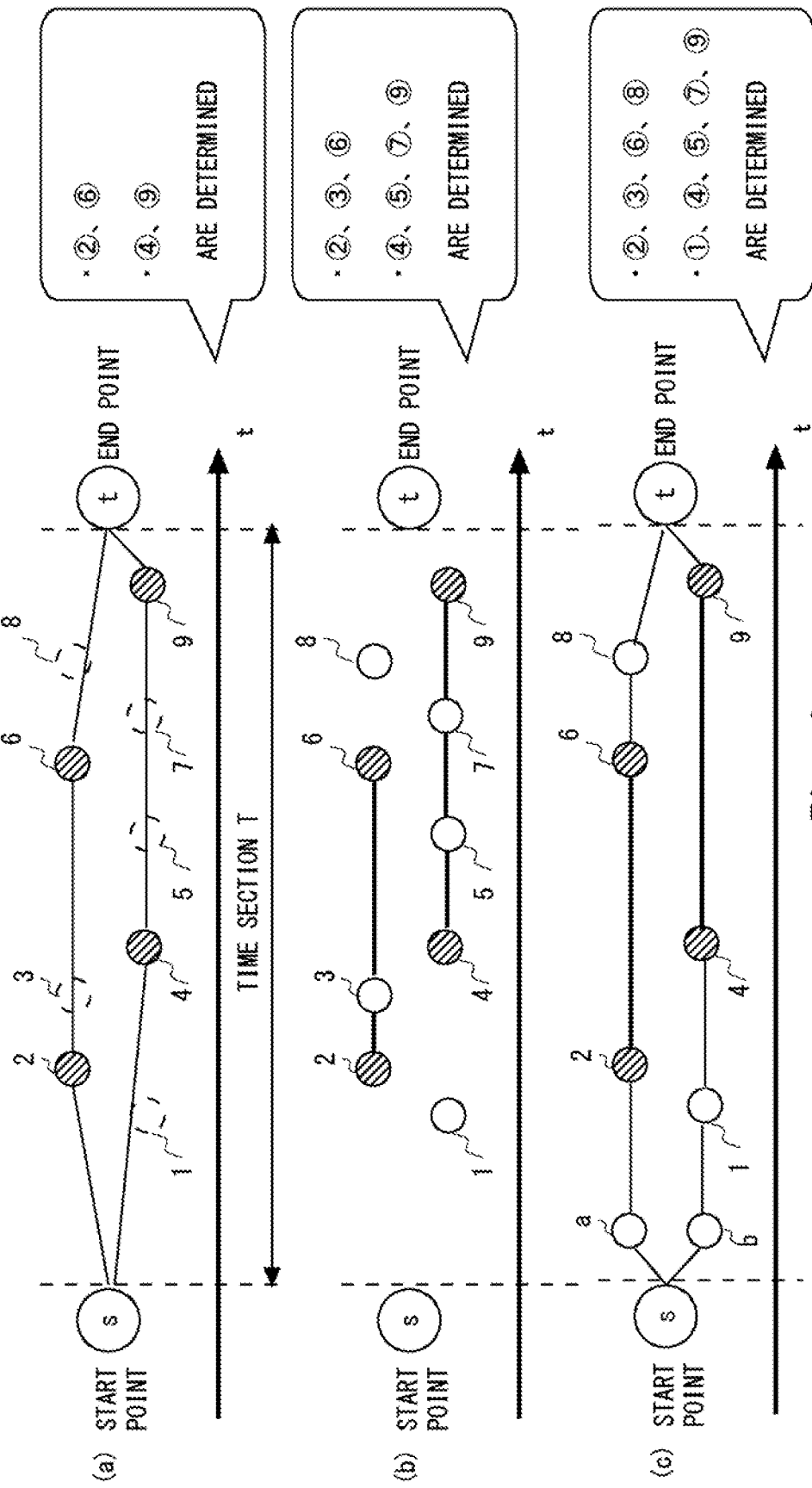
FIG. 8 is a schematic diagram showing an example in which linkage of trajectories is obtained by a minimum cost flow in the third example embodiment.

Next, a linking method by a minimum cost flow according to this example embodiment will be described by using a specific example. FIG. 8 shows an example of linkage of trajectories by a minimum cost flow according to this example embodiment. FIGS. 8(*a*) and 8(*b*) are the same as FIGS. 4(*a*) and 4(*b*). FIG. 8(*c*) shows processes performed by the overall trajectory linking unit 205, in which a linked trajectory a and a linked trajectory b obtained in the preceding time section are added, and shows a process for linking the remaining trajectories in the network in which the linkage obtained in FIG. 8(*b*) have been short-circuited. Then, the obtained result is combined with the result in FIG. 8(*b*). By doing so, in this case, the trajectories 2, 3, 6 and 8 are linked with one another, and the trajectories 1, 4, 5, 7 and 9 are linked with one another. Further, the former is linked to the linked trajectory a in the preceding time section, and the latter is linked to the linked trajectory b in the preceding time section. In this way, linked trajectories can be obtained.

Next, a flow of processes according to this example embodiment will be described by using a flowchart. Processes performed by the image information acquisition unit 106 and the object detection tracking unit 107 are similar to those in the flowchart shown in FIG. 5. Therefore, the description thereof is omitted here.

Figure 9:
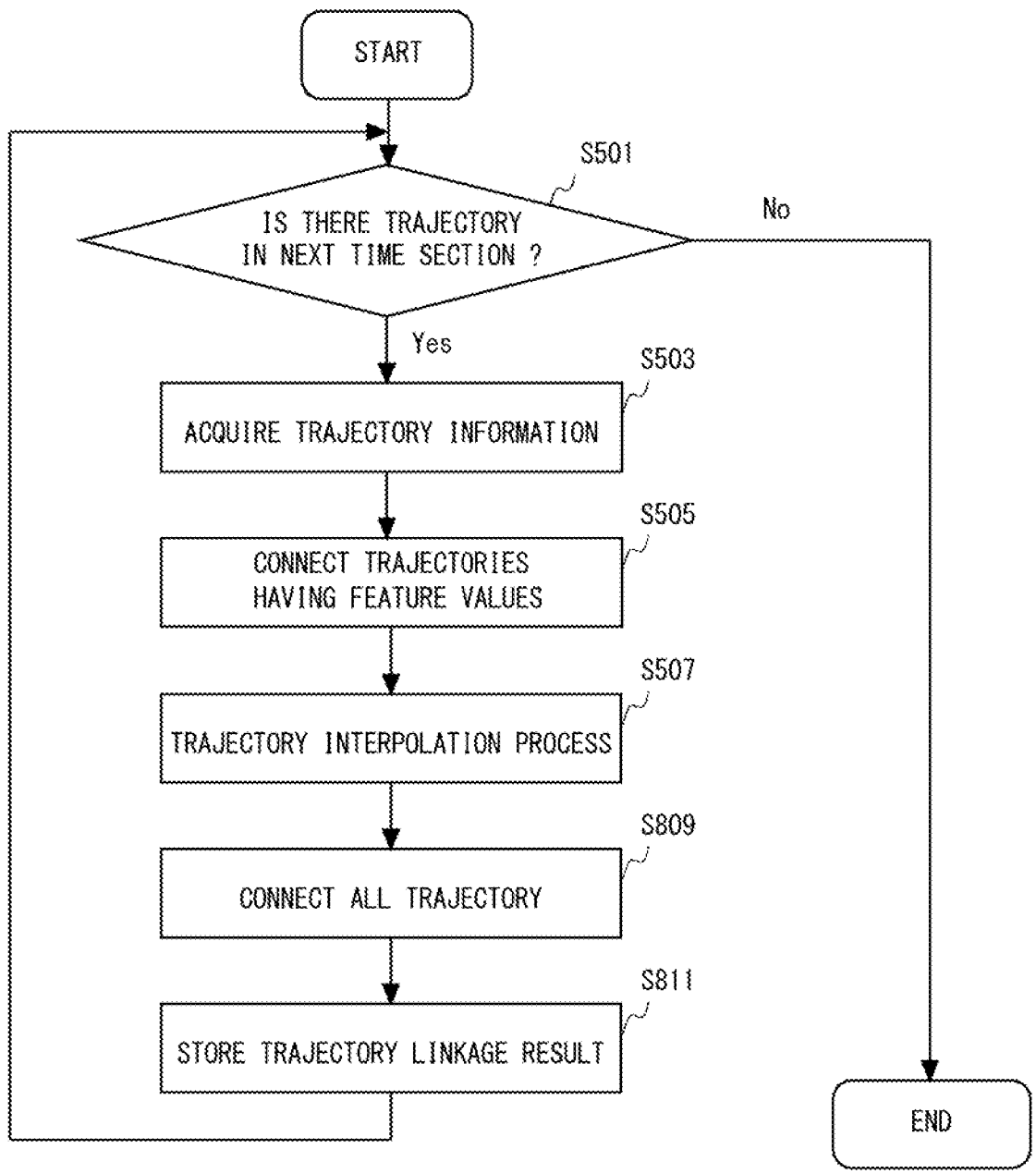
FIG. 9 is a flowchart showing processes performed by a trajectory linking apparatus in the third example embodiment.

FIG. 9 is a flowchart showing a flow of processes performed by the feature-including trajectory linking unit 101, the interpolation unit 102, the overall trajectory linking unit 205, and the trajectory linkage result storage unit 206. Steps S501, S503, S505 and S507 are similar to those in FIG. 6. The overall trajectory linking unit 205 generates a trajectory linkage result by linking the whole trajectories, and outputs the generated trajectory linkage result (Step S809). Then, the generated trajectory linkage result is stored in the trajectory linkage result storage unit 206 (Step S811). After the step S811, the process returns to the step S501.

In this example embodiment, trajectories are linked with one another while including trajectories obtained in the preceding time section, thus making it possible to generate a movement line by linking trajectories extending over a plurality of time sections.

<Example of Hardware Configuration>

Next, an example of a hardware configuration will be described.

Figure 10:
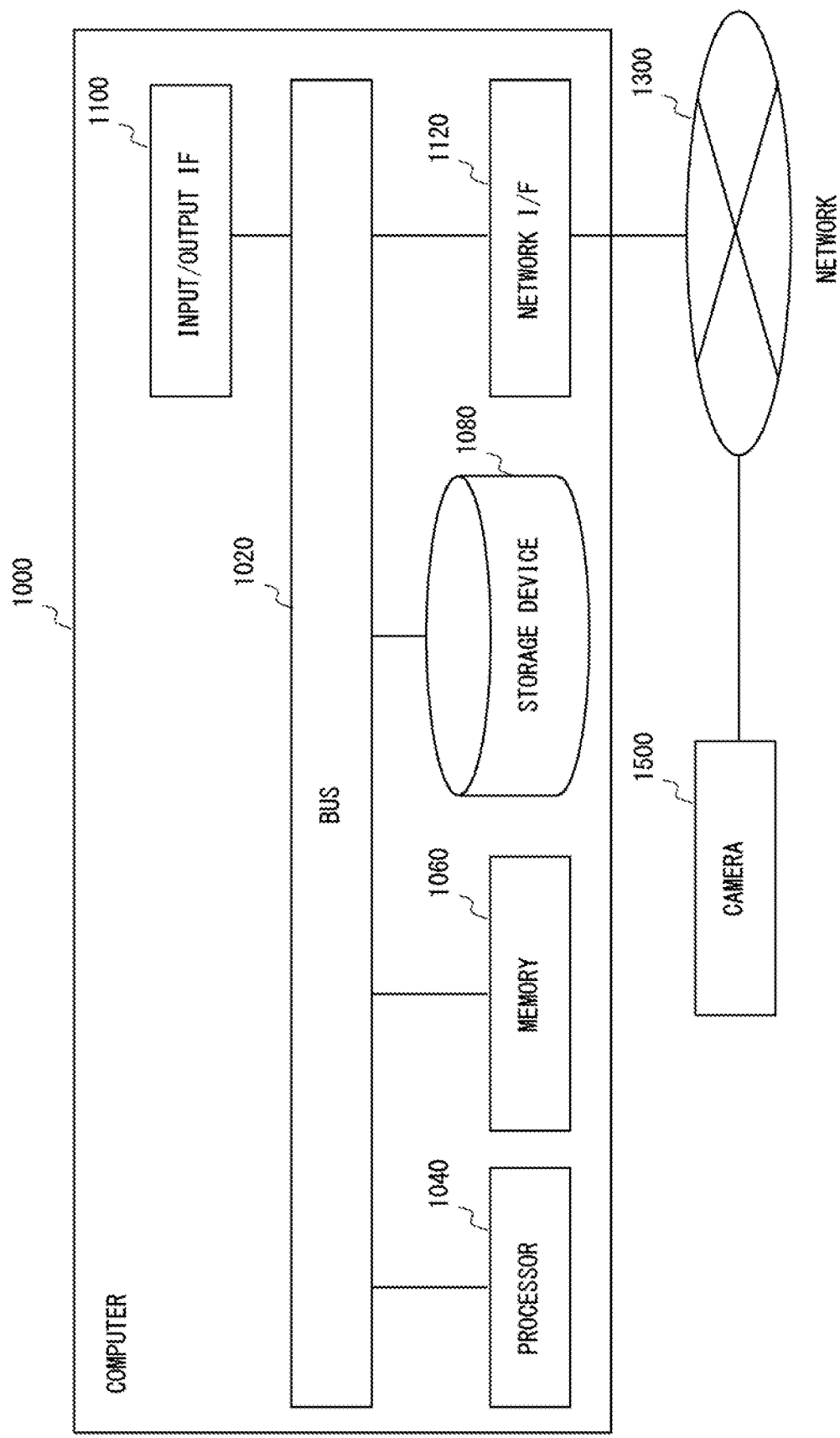
FIG. 10 is a configuration diagram showing an example of a hardware configuration of a trajectory linking apparatus.

FIG. 10 shows an example of a computer 1000, a network 1300, and a camera 1500 for implementing a trajectory linking apparatus 100. The computer 1000 is an arbitrary computer. For example, the computer 1000 may be a Personal Computer (PC), a server machine, a tablet-type terminal, or a smartphone. The computer 1000 may be a dedicated computer designed to implement the trajectory linking apparatus 100, or may be a general-purpose computer.

The computer 1000 includes a bus 1020, a processor 1040, a memory 1060, a storage device 1080, an input/output interface 1100, and a network interface 1120. The bus 1020 is a data transmission path through which the processor 1040, the memory 1060, the storage device 1080, the input/output interface 1100, and the network interface 1120 transmit/receive data to/from each other. However, the method for connecting the processor 1040 and other components and the like with each other is not limited to the bus connection. The processor 1040 is any of a variety of processors, such as a CPU (Central Processing Unit), a GPU (Graphics Processing Unit), or an FPGA (Field-Programmable Gate Array). The memory 1060 is a main storage device implemented by using a RAM (Random Access Memory) and the like. The storage device 1080 is an auxiliary storage device implemented by using a hard disk drive, an SSD (Solid State Drive), a memory card, or a ROM (Read Only Memory).

The input/output interface 1100 is an interface for connecting the computer 1000 with input/output devices. For example, an input device such as a keyboard and an output device such as a display device are connected to the input/output interface 1100.

The network interface 1120 is an interface for connecting the computer 1000 to the network 1300. This network is, for example, a LAN (Local Area Network) or a WAN (Wide Area Network). The method by which the network interface 1120 is connected to the network may be a wireless connection or a wired connection.

Further, the camera 1500 is connected to the network 1300. The computer 1000 and the camera 1500 can communicate, i.e., transmit/receive, data through the network 1300. The camera 1500 corresponds to the image information acquisition unit 106 of the trajectory linking apparatus 100.

The storage device 1080 stores program modules for implementing respective means of the trajectory linking apparatus 100. The processor 1040 implements a function corresponding to each of these program modules by loading a respective one of the program modules into the memory 1060, and executes the loaded program module.

Note that some of the functions of the trajectory linking apparatus 100 may be performed on the camera 1500 side. That is, a processor, a storage device, and a memory may be provided inside the camera 1500, and all or some of the processes of each means of the trajectory linking apparatus 100 may be performed by using these components. For example, the processes of the image information acquisition unit 106 and the object detection tracking unit 107 may be performed on the camera 1500 side, and the other processes may be performed on the computer 1000 side. Alternatively, among the processes of the object detection tracking unit 107, the processes up to those performed by the object detection unit 151 may be performed on the camera side, and the rest of the processes may be performed on the computer 1000 side.

Further, the image information acquisition unit 106 may be a video recording apparatus such as a hard disk recorder that stores video images captured by a camera. In this case, the image information acquisition unit 106 acquires video images by reading and playing back video images stored in the video recording apparatus, and transmitting them to the computer 1000 side through the network 1300. Then, the subsequent processes are performed on the computer 1000 side.

The present invention has been described above by using examples in which the present invention is applied to the above-described example embodiments. However, the technical scope of the present invention is not limited to the scope described in the above-described example embodiments. It is obvious to those skilled in the art that various modifications or improvements can be made to those example embodiments. In such cases, new example embodiments in which such modifications or improvements may be made also fall in the technical scope of the present invention. This is obvious from the matters described in the claims.

By using a trajectory linking apparatus according to this example embodiment, even when a tracking result is disconnected due to occlusion or the like, it is still possible to link movement lines, and thereby to keep track of the behavior of an object over a wide area. Therefore, it can be used for tracking between cameras in video monitoring or the like, and for the analysis of the behavior of an object(s) using obtained movement line information.

Further, the above-described program can be stored and provided to a computer using any type of non-transitory computer readable media. Non-transitory computer readable media include any type of tangible storage media. Examples of non-transitory computer readable media include magnetic storage media, optical magnetic storage media, CD-ROM (Read Only Memory), CD-R, CD-R/W, and semiconductor memories. Examples of magnetic storage media include floppy disks, magnetic tapes, hard disk drives. Examples of optical magnetic storage media include magneto-optical disks. Examples of semiconductor memories include mask ROM, PROM (programmable ROM), EPROM (erasable PROM), and flash ROM, RAM (Random Access Memory).

Further, the program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The whole or part of the example embodiments disclosed above can be described as, but not limited to, the following supplementary notes.

(Supplementary Note 1)

A trajectory linking apparatus comprising first means and second means, wherein the first means receives trajectory information for each time segment (each time section), the trajectory information representing a plurality of trajectories indicating respective movement paths of a plurality of objects detected from image data (image information) of a respective time segment, and also indicating whether or not each of the trajectories has a feature for object re-identification, the first means generates a linked trajectory having a feature by linking a first trajectory included in first trajectory information obtained from image data in a first time segment to a second trajectory included in second trajectory information obtained from image data in a second time segment different from the first time segment, the first trajectory having the feature, and the second trajectory having the feature, and the second means generates an interpolated trajectory by linking a third trajectory included in third trajectory information obtained from image data in a third time segment between the first and second time segments to the first and second trajectories, the third trajectory not having the feature.

(Supplementary Note 2)

The trajectory linking apparatus described in Supplementary note 1, further comprising third means for generating an overall trajectory by further linking, to the interpolated trajectory, a fourth trajectory included in fourth trajectory information obtained from image data in a fourth time segment before the first time segment, or a fifth trajectory included in a fifth trajectory information obtained from image data in a fifth time segment after the second time segment, the fourth trajectory not having the feature, and the fifth trajectory not having the feature.

(Supplementary Note 3)

The trajectory linking apparatus described in Supplementary note 2, wherein the third means further links the overall trajectory to an overall trajectory obtained in the past.

(Supplementary Note 4)

The trajectory linking apparatus described in any one of Supplementary notes 1 to 3, further comprising fourth means for detecting and tracking each object from image data in each time segment and thereby generating a trajectory of that object, and for attempting to extract a feature value for re-identifying that object from the image data in each time segment.

(Supplementary Note 5)

The trajectory linking apparatus described in any one of Supplementary notes 1 to 4, wherein the first means determines a cost representing a likelihood of linkage of the trajectories having features by using spatio-temporal proximity of the trajectories having features and similarity of the features, and generates a linked trajectory having a feature based on the cost, and the second means determines the cost by using the spatio-temporal proximity of the trajectories and generates the interpolated trajectory based on the cost.

(Supplementary Note 6)

The trajectory linking apparatus described in any one of Supplementary notes 1 to 5, wherein the second means determines a cost representing a likelihood of linkage of the trajectories, and generates the interpolated trajectory by determining a path in which a sum total of the cost is minimized.

(Supplementary Note 7)

The trajectory linking apparatus described in any one of Supplementary notes 1 to 6, wherein the first means generates the linked trajectory having a feature by solving a minimum cost flow problem.

(Supplementary Note 8)

The trajectory linking apparatus described in Supplementary note 2 or 3, wherein the third means generates an overall trajectory by solving a minimum cost flow problem.

(Supplementary Note 9)

The trajectory linking apparatus according to Supplementary note 8, wherein the third means generates the overall trajectory by integrating the linked trajectory determined by building a network in which the trajectories corresponding to the interpolated trajectory are short-circuited and solving a minimum cost flow problem with the interpolated trajectory.

(Supplementary Note 10)

A trajectory linking method comprising:

receiving trajectory information for each time segment (each time section), the trajectory information representing a plurality of trajectories indicating respective movement paths of a plurality of objects detected from image data (image information) of a respective time segment, and also indicating whether or not each of the trajectories has a feature for object re-identification;

generating a linked trajectory having a feature by linking a first trajectory included in first trajectory information obtained from image data in a first time segment to a second trajectory included in second trajectory information obtained from image data in a second time segment different from the first time segment, the first trajectory having the feature, and the second trajectory having the feature, and generating an interpolated trajectory by linking a third trajectory included in third trajectory information obtained from image data in a third time segment between the first and second time segments to the first and second trajectories, the third trajectory not having the feature.

(Supplementary Note 11)

A non-transitory computer readable medium storing a program for causing a computer to perform processes including:

receiving trajectory information for each time segment (each time section), the trajectory information representing a plurality of trajectories indicating respective movement paths of a plurality of objects detected from image data (image information) of a respective time segment, and also indicating whether or not each of the trajectories has a feature for object re-identification;

generating a linked trajectory having a feature by linking a first trajectory included in first trajectory information obtained from image data in a first time segment to a second trajectory included in second trajectory information obtained from image data in a second time segment different from the first time segment, the first trajectory having the feature, and the second trajectory having the feature, and generating an interpolated trajectory by linking a third trajectory included in third trajectory information obtained from image data in a third time segment between the first and second time segments to the first and second trajectories, the third trajectory not having the feature.

REFERENCE SIGNS LIST

100 TRAJECTORY LINKING APPARATUS
152 TRACKING UNIT

153 FEATURE EXTRACTION UNIT
101 FEATURE-INCLUDING TRAJECTORY LINKING UNIT
102 INTERPOLATION UNIT
105, 205 OVERALL TRAJECTORY LINKING UNIT
106 IMAGE INFORMATION ACQUISITION UNIT
107 OBJECT DETECTION TRACKING UNIT
151 OBJECT DETECTION UNIT
154 INTEGRATION UNIT
206 TRAJECTORY LINKAGE RESULT STORAGE UNIT
1, 2, 3, 4, 5, 6, 7, 8, 9 TRAJECTORY
a, b LINKED TRAJECTORY

What is claimed is:

1. A trajectory linking apparatus comprising:
at least one memory storing instructions; and
at least one processor configured to execute the instructions to:
receive, for each of a plurality of time segments, trajectory information representing a plurality of trajectories indicating respective movement paths of a plurality of objects detected from image data of the each time segment, and indicating whether or not each of the trajectories has a feature value permitting object identification;
generate a linked trajectory having the feature value by linking a first trajectory included in first trajectory information obtained from the image data in a first time segment to a second trajectory included in second trajectory information obtained from the image data in a second time segment different from the first time segment, the first trajectory and the second trajectory each having the feature value permitting object identification;
generate an interpolated trajectory by linking a third trajectory included in third trajectory information obtained from the image data in a third time segment between the first and second time segments to the first and second trajectories, the third trajectory not having the feature value permitting object identification as a result of object occlusion; and
track a corresponding object from the image data in the first time segment, through the image data in the third time segment, to the image data in the second time segment, based on the interpolated trajectory, wherein the third trajectory does not have the feature value permitting object identification.

2. The trajectory linking apparatus according to claim 1, wherein the at least one processor is configured to execute the instructions to further:
generate an overall trajectory by linking, to the interpolated trajectory, a fourth trajectory included in fourth trajectory information obtained from the image data in a fourth time segment before the first time segment, or a fifth trajectory included in fifth trajectory information obtained from the image data in a fifth time segment after the second time segment, neither the fourth trajectory nor the fifth trajectory having the feature value.

3. The trajectory linking apparatus according to claim 2, wherein the at least one processor is configured to execute the instructions to further:
link the overall trajectory to a previously obtained overall trajectory.

4. The trajectory linking apparatus according to claim 1, wherein the at least one processor is configured to execute the instructions to further:
for each object, detect and track the each object from the image data in each time segment and generate the trajectory of the each object, and attempt to extract the feature value from the image data in each time segment.

5. The trajectory linking apparatus according to claim 1, wherein the at least one processor is configured to execute the instructions to further:
determine a cost representing a likelihood of linkage of the trajectories having the feature value by using spatio-temporal proximity of the trajectories having the feature value and similarity of the feature value in each trajectory, and generate the linked trajectory having the feature value based on the cost; and
generate the interpolated trajectory based on the cost.

6. The trajectory linking apparatus according to claim 1, wherein the at least one processor is configured to execute the instructions to further:
determine a cost representing a likelihood of linkage of the trajectories, and generate the interpolated trajectory by determining a path in which a sum total of the cost is minimized.

7. The trajectory linking apparatus according to claim 1, wherein the at least one processor is configured to execute the instructions to further:
generate the linked trajectory having feature value by solving a minimum cost flow problem.

8. The trajectory linking apparatus according to claim 2, wherein the at least one processor is configured to execute the instructions to further:
generate an overall trajectory by solving a minimum cost flow problem.

9. A trajectory linking method performed by a computer and comprising:
receiving, for each of a plurality of time segments, trajectory information representing a plurality of trajectories indicating respective movement paths of a plurality of objects detected from image data of the each time segment, and indicating whether or not each of the trajectories has a feature value permitting object identification;
generating a linked trajectory having the feature value by linking a first trajectory included in first trajectory information obtained from the image data in a first time segment to a second trajectory included in second trajectory information obtained from the image data in a second time segment different from the first time segment, the first trajectory and the second trajectory each having the feature value permitting object identification;
generating an interpolated trajectory by linking a third trajectory included in third trajectory information obtained from the image data in a third time segment between the first and second time segments to the first and second trajectories, the third trajectory not having the feature value permitting object identification as a result of object occlusion; and
tracking a corresponding object from the image data in the first time segment, through the image data in the third time segment, to the image data in the second time segment, based on the interpolated trajectory, wherein the third trajectory does not have the feature value permitting object identification.

10. A non-transitory computer readable medium storing a program for causing a computer to perform processing including:
receiving, for each of a plurality of time segments, trajectory information representing a plurality of trajectories indicating respective movement paths of a plurality of objects detected from image data of the each time segment, and indicating whether or not each of the trajectories has a feature value permitting object identification;

generating a linked trajectory having the feature value by linking a first trajectory included in first trajectory information obtained from the image data in a first time segment to a second trajectory included in second trajectory information obtained from the image data in a second time segment different from the first time segment, the first trajectory and the second trajectory each having the feature value permitting object identification;

generating an interpolated trajectory by linking a third trajectory included in third trajectory information obtained from the image data in a third time segment between the first and second time segments to the first and second trajectories, the third trajectory not having the feature value permitting object identification as a result of object occlusion; and tracking a corresponding object from the image data in the first time segment, through the image data in the third time segment, to the image data in the second time segment, based on the interpolated trajectory, wherein the third trajectory does not have the feature value permitting object identification.

* * * * *